United States Patent
Saga et al.

(10) Patent No.: US 8,218,278 B2
(45) Date of Patent: Jul. 10, 2012

(54) CURRENT DIFFERENTIAL RELAY DEVICE, SIGNAL PROCESSING METHOD THEREOF AND POWER TRANSMISSION LINE PROTECTION SYSTEM

(75) Inventors: Masamichi Saga, Fuchu (JP); Itsuo Shuto, Hachioji (JP); Mitsuaki Mizunoue, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 841 days.

(21) Appl. No.: 12/280,494

(22) PCT Filed: Feb. 28, 2007

(86) PCT No.: PCT/JP2007/000143
§ 371 (c)(1),
(2), (4) Date: Dec. 3, 2008

(87) PCT Pub. No.: WO2007/099712
PCT Pub. Date: Sep. 7, 2007

(65) Prior Publication Data
US 2009/0174976 A1    Jul. 9, 2009

(30) Foreign Application Priority Data

Feb. 28, 2006  (JP) ................. 2006-054152

(51) Int. Cl.
*H02H 3/00* (2006.01)
*H02H 7/26* (2006.01)
(52) U.S. Cl. ............. 361/65; 361/63; 361/64; 361/66
(58) Field of Classification Search .......... 361/63, 361/65, 64, 66
See application file for complete search history.

(56) References Cited

U.S. PATENT DOCUMENTS

| | | | | |
|---|---|---|---|---|
| 4,561,120 A | * | 12/1985 | Andow et al. | 398/6 |
| 4,612,594 A | * | 9/1986 | Yamaura et al. | 361/68 |
| 7,126,800 B2 | * | 10/2006 | Premerlani et al. | 361/68 |
| 7,415,090 B2 | * | 8/2008 | Jeong | 375/355 |

FOREIGN PATENT DOCUMENTS

| | | |
|---|---|---|
| EP | 0 078 517 A2 | 5/1983 |
| EP | 0 135 110 A2 | 3/1985 |
| JP | 60-055823 A | 4/1985 |
| JP | 61-247214 A | 11/1986 |
| JP | 64-000890 B2 | 1/1989 |
| JP | 1-024014 B2 | 5/1989 |
| JP | 7-212958 A | 8/1995 |
| JP | 10-070834 A | 3/1998 |

* cited by examiner

*Primary Examiner* — Rexford Barnie
*Assistant Examiner* — Zeev V. Kitov
(74) *Attorney, Agent, or Firm* — Foley & Lardner LLP

(57) ABSTRACT

A current differential relay device is described. The device has two transmission parts provided in parallel and communicating with an other end of a power transmission line through two transmission paths and transmitting and receiving a quantity data of electricity of each of the terminals to and from an other end in the form of the digital data obtained through analog/digital conversion. Two current differential operation parts are connected to each of the two transmission parts and perform a current differential operation independently for each of the transmission paths by using the digital data of the quantity data of electricity of the one end of the power transmission line and of the other end of the power transmission line. A signal generation part generates a trip signal from the current differential operation result of the two current differential operation parts.

3 Claims, 5 Drawing Sheets

FIG. 5
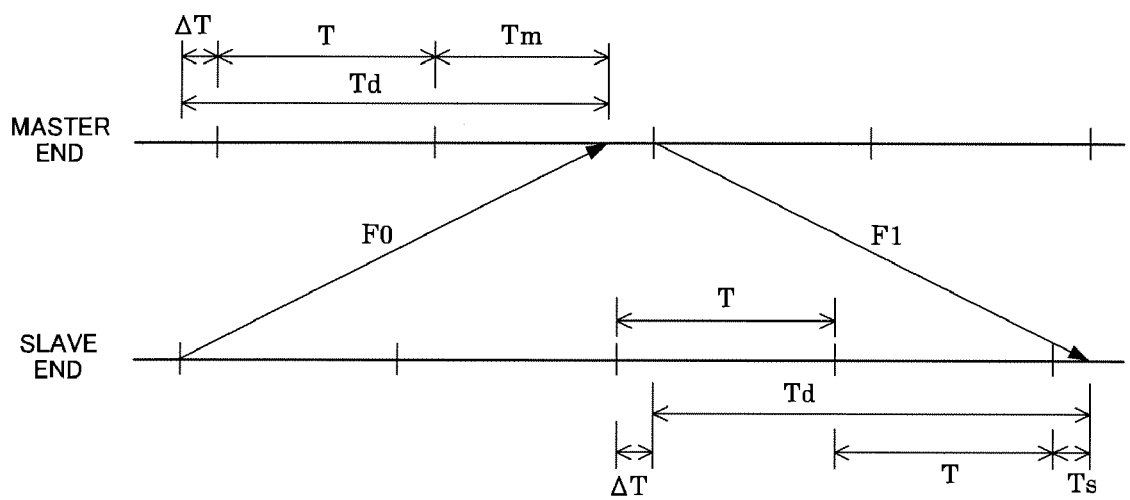
(a)
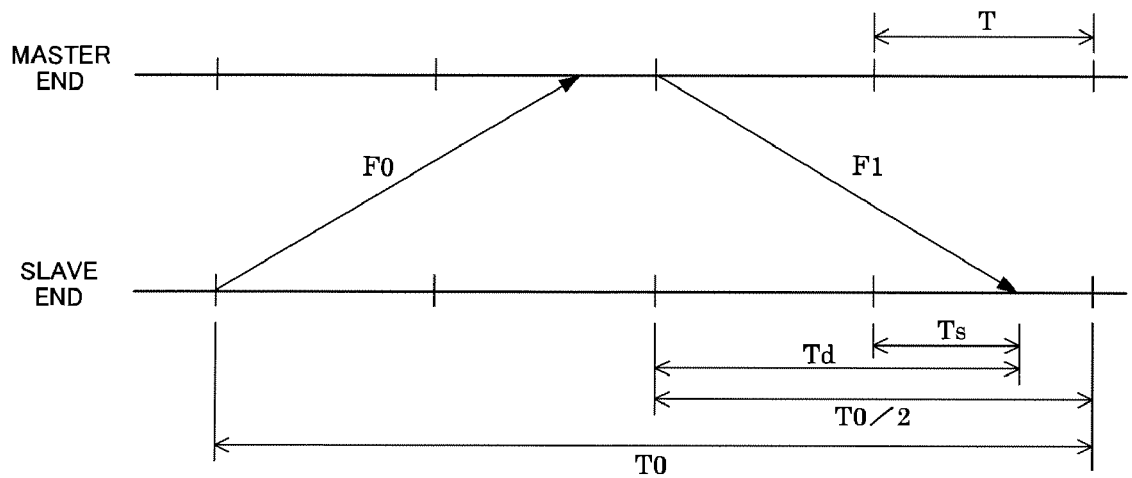
(b)

CURRENT DIFFERENTIAL RELAY DEVICE, SIGNAL PROCESSING METHOD THEREOF AND POWER TRANSMISSION LINE PROTECTION SYSTEM

TECHNICAL FIELD

The present invention relates to a current differential relay device which protects a power transmission line of an electric power system and, more particularly, to a current differential relay device which performs data communications via two transmission paths.

BACKGROUND OF THE INVENTION

Conventionally, systems of every kind which employ a current differential relay device for the purpose of protecting a power transmission line of an electric power system have been proposed. FIG. 4 is a configuration diagram of an example of such a conventional power transmission line protection system and, in particular, of a transmission path duplex system in which transmission paths are duplexed.

In the power transmission line protection system shown in FIG. 4, two current differential relay devices 1 (1a and 1b) are installed at the respective terminals 3 (slave end 3a and master end 3b) of a two-terminal power transmission line 2. The two current differential relay devices 1 capture quantity data of electricity of the electric power systems from the current transformers 4 (4a and 4b) of each terminal 3, are connected to each other via two transmission paths 5 and 6, and perform current differential operations by transmitting and receiving the quantity data of electricity of the respective terminals to each other.

Alphabetic characters "a" and "b" which are appended to the final letters of reference numerals which represent the respective constituent elements in FIG. 4 are used in order to differentiate between the slave end 3a and master end 3b of the two-terminal power transmission line 2 as well as between the two current differential relay devices 1a and 1b which are installed at the respective terminals 3a and 3b. In this case, the configurations of the two current differential relay devices 1a and 1b are mostly the same with some exceptions and, apart from the appended alphabetic characters "a" and "b", the constituent elements indicated by the same reference numerals have the same configuration. Hence, in the following description, the appended characters "a" and "b" appear only in cases where such clear differentiation is required from the perspective of simplification and are suitably omitted in cases where such differentiation is unnecessary.

The current differential relay devices 1 each has an analog/digital conversion means (A/D conversion means) 11 which first captures quantity data of electricity of the electric power systems from the current transformers 4 in the form of analog inputs and performs analog/digital conversion on the quantity data of electricity, a reception changeover means 12 for performing reception changeover between the two transmission paths 5 and 6, and a transmission means 13 for communicating with the current differential relay device 1 at the other end of the power transmission line via the reception changeover means 12. The transmission means 13 is provided with a disturbance detection unit 131 which detects transmission defects in the transmission paths 5 and 6.

In a conventional transmission path duplex system of the kind shown in FIG. 4, the transmission means 13 receives data from the reception side transmission path which corresponds with the reception changeover by the reception changeover means 12 and transmits data in parallel to the two transmission paths 5 and 6. Further, in cases where a transmission defect in the current reception side transmission path is detected by the disturbance detection unit 131, the transmission means 13 transfers a transmission defect detection signal which indicates the transmission defect to the reception changeover means 12 to make it perform reception changeover. The details of the transmission path duplex system will be described subsequently.

The current differential relay devices 1 each further has a current differential operation means 14 which receives quantity data of electricity of its own end of the power transmission line from the analog/digital conversion means 11, receives quantity data of electricity of the other end of the power transmission line which are received by means of the transmission means 13, and performs a current differential operation by using these quantity data of electricity; a sequence operation means 15 which uses the current differential operation result to perform logic sequence processing and generate a trip signal; and an output means 16 which outputs the trip signal thus generated to a circuit breaker 7 at its own end of the power transmission line. As the current differential operation means 14, specifically "87 relays" or the like are used.

In addition, the current differential relay device 1a of the slave end 3a has a timing difference measurement means 17a for measuring the sampling pulse signal timing difference, a correction means 18a for calculating a correction amount for achieving synchronization with the sampling pulse signal of the master end 3b on the basis of the measured timing difference, and a sampling pulse generation means 19a for generating a sampling pulse signal which is sampling-synchronized with the master end 3b and transferring the sampling pulse signal to analog/digital conversion means 11a. In contrast, the current differential relay device 1b of the master end 3b has only timing difference measurement means 17b and sampling pulse generation means 19b.

In the power transmission line protection system in FIG. 4, although a sampling pulse signal is transferred from the sampling pulse generation means 19 to the analog/digital conversion means 11 in order to capture quantity data of electricity of the line, the sampling pulse signal of the current differential relay device 1a of the slave end 3a is synchronized with the sampling pulse signal of the master end 3b by the correction means 18a. The sampling pulse signal timing difference is calculated by the timing difference measurement means 17a and 17b in accordance with the data from the transmission path connected by the reception changeover means 12.

Here, in the current differential relay device 1a of the slave end 3a, a sampling pulse signal correction amount for achieving synchronization with the sampling pulse signal of the master end 3b is calculated by the correction means 18a on the basis of the timing difference between the slave end 3a and master end 3b, and a sampling pulse signal which is sampling-synchronized with the master end 3b is generated by the sampling pulse generation means 19a.

As specific sampling synchronization methods, the technologies which appear in Patent Document 1 and Patent Document 2, for example, have been proposed.

[Principles of Sampling Synchronization]

The principles of the sampling synchronization of the current differential relay devices of the master end and the slave end will be described hereinbelow by using FIG. 5(a) and FIG. 5(b). From the standpoint of simplification, the "master end" and "slave end" in the drawings and in the following description are abbreviations for "the current differential relay device of the master end" and the "current differential relay device of the slave end" and "device" is likewise an abbreviation for "current differential relay device".

FIG. 5(*a*) shows a state where sampling is carried out by both a first terminal (the master end) and another terminal (the slave end) using a fixed sampling cycle T, and a sampling pulse signal timing difference of ΔT is arising between the master end and the slave end.

In FIG. 5(*a*), firstly, at the slave end, a synchronization signal (a sampling synchronization flag) is transmitted to the master end together with quantity data of electricity (F0). At the master end, a reception timing difference Tm from the sampling timing of its own device until the reception timing of data containing the sampling synchronization flag is measured, and the sampling synchronization flag and the measured reception timing difference Tm are sent back to the slave end together with the quantity data of electricity (F1).

Subsequently, similarly to the master end, the slave end measures the reception timing difference Ts from the sampling timing of its own device until the reception timing of the data containing the sampling synchronization flag and reads the reception timing difference Tm measured at the master end.

Here, supposing that an upstream transmission delay time up until the transmission data of the slave end arrive at the master end and a downstream transmission delay time up until the transmission data of the master end arrive at the slave end are both Td and equal, the transmission delay time Td can be expressed by the following Expressions (1) and (2) respectively by using the reception timing difference Tm or the reception timing difference Ts measured at the master end or the slave end, the sampling pulse signal timing difference ΔT, and the sampling cycle T.

$$Td = Tm + \Delta T + iT \quad (1)$$

$$Td = Ts - \Delta T + jT \quad (2)$$

where i and j are both integers.

In FIG. 5(*a*) and FIG. 5(*b*), i=1 and j=2.

Here, when the difference between Expressions (1) and (2) is taken and an arrangement as to ΔT is made, the following Expression (3) is obtained.

$$2\Delta T = Ts - Tm + (j-i)T \quad (3)$$

In addition, since the sampling pulse signal timing difference ΔT is, due to its very nature, always smaller than the sampling cycle T, the term (j−1)T in Expression (3) (that is, the multiple of T) can be eliminated. Hence, the following Expression (4) for calculating the sampling pulse signal timing difference ΔT is obtained from Expression (3).

$$\Delta T = (Ts - Tm)/2 \quad (4)$$

Therefore, at the slave end, the sampling timing between the two mutually independent devices of the master and slave ends can be equalized by calculating Expression (4) and shifting the sampling timing of the slave end so that the sampling pulse signal timing difference ΔT is substantially zero. At the master end, the determined sampling pulse signal timing difference is used only in the judgment of whether sampling synchronization is to be implemented and correction of the sampling pulse is not performed.

FIG. 5(*b*) shows a state where the sampling timings of the master end and the slave end match each other. In this case, the slave end measures a sampling frequency T0 from the point where the sampling synchronization flag is sent until the sampling synchronization flag is sent back by the master end and calculates the transmission delay time Td by using the following expression from the sampling frequency T0, the timing difference Ts measured beforehand, and the sampling cycle T.

$$Td = T0/2 - T + Ts \quad (5)$$

At the slave end, since it is judged and become clear by using Expression (5) to what extent the data sent back from the master end are delayed with respect to the sampling timing of its own end, it is possible to perform an operation in which data sampled at the same time at the slave end and the master end are used.

[Transmission Path Duplex System]

A transmission path duplex system of the kind shown in FIG. 4 will be described in detail hereinbelow.

Generally, the operating ratio (the temporal probability of the protection function functioning normally) of a current differential relay device which protects a power transmission line by using a transmission path depends largely on the quality of the transmission path. That is, when a transmission defect arises in a transmission path, the current differential relay device basically prevents a malfunction by locking the current differential operation means. The protection function therefore stops and the operating ratio is reduced depending on the function stoppage.

In contrast, a transmission path duplex system is a system which has been proposed in order to improve the operating ratio of a current differential relay device by shortening the function stoppage time of the current differential relay device, even in cases where a transmission path of a quality which is not ideal is utilized. The transmission path duplex system connects two current differential relay devices provided at two terminals to each other via a duplexed transmission path.

In the conventional transmission path duplex system shown in FIG. 4, the transmission path is duplexed through two transmission paths 5 and 6, where one transmission path is applied for regular use and the other transmission path is applied for standby. Here, a case where transmission path 5 is applied for regular use and transmission path 6 is applied for standby will be described by way of an example. Transmission signals are outputted in parallel to the two transmission paths 5 and 6.

In the current differential relay devices 1*a* and 1*b* shown in FIG. 4, data are normally received from the other end of the power transmission line via the regular use transmission path 5 by connecting transmission means 13*a* and 13*b* to the regular use transmission path 5 via reception changeover means 12*a* and 12*b* of the current differential relay devices 1*a* and 1*b*. However, when a transmission defect arises in the regular use transmission path 5, current differential operation means 14*a* and 14*b* are locked.

A confirmation time of the order of ten seconds, for example, is provided in order to prevent excessive transmission path reception changeover when a transmission defect arises in the regular use transmission path 5. Disturbances in the transmission paths are detected by disturbance detection units 131*a* and 131*b* of the transmission means 13*a* and 13*b* within the confirmation time and it is judged whether transmission path reception changeover is required due to a disturbance. In cases where reception changeover is required, the transmission defect detection signal is transferred to the reception changeover means 12*a* and 12*b*, and reception changeover from the regular use transmission path 5 to the standby transmission path 6 is performed automatically by the reception changeover means 12*a* and 12*b*. As a result of the reception changeover, the lock on the current differential operation means 14*a* and 14*b* is released and the current differential operation can be continued.

When such a reception changeover system is employed, even in the case of a current differential relay device provided for a single transmission path, there is no need to change the transmission control and current differential operation mechanisms in any way and the current differential relay device can be easily made compatible with a transmission path duplex system simply by providing transmission path reception changeover means, which represents a major advantage in implementation.

As shown in the Expression (4) for calculating the sampling pulse signal timing difference ΔT, the sampling pulse signal timing difference ΔT does not depend on the transmission delay time Td of the transmission path. Hence, even though the transmission delay time of the one transmission path 5 and the other transmission path 6 are Td1 and Td2 respectively and are different from each other, the same sampling pulse signal timing difference ΔT is calculated as indicated by the following Expressions (6) to (13) from the respective reception timings Ts1, Tm1 and Ts2 and Tm2.

Therefore, during transmission path reception changeover, even when the transmission delay times of the two transmission paths 5 and 6 differ, there is no need to recapture the sampling signal (for example, in cases where the transmission path reception changeover is carried out when the sampling pulse signal timing difference ΔT=0, if the slippage while the sampling synchronization is interrupted due to a transmission defect is removed, the sampling pulse signal timing difference ΔT which is newly calculated in the transmission after changeover is also zero).

During selection of transmission path 5:

$$Td1 = Tm1 + \Delta T + iT \quad (6)$$

$$Td1 = Ts1 - \Delta T + jT \quad (7)$$

$$\Delta T = (Ts1 - Tm1)/2 \quad (8)$$

$$Td1 = T0/2 - T + Ts1 \quad (9)$$

During selection of transmission path 6:

$$Td2 = Tm2 + \Delta T + iT \quad (10)$$

$$Td2 = Ts2 - \Delta T + jT \quad (11)$$

$$\Delta T = (Ts2 - Tm2)/2 \quad (12)$$

$$Td2 = T0/2 - T + Ts2 \quad (13)$$

[Patent Documents]
Patent Document 1:
Japanese Patent Publication No. H1-890
Patent Document 2:
Japanese Patent Publication No. H1-24014

In a power transmission line protection system of a conventional transmission path duplex system of the kind mentioned hereinabove, it is necessary to provide the transmission path reception changeover with a confirmation time in order to prevent excessive transmission path reception changeover as mentioned hereinabove. However, when a transmission defect arises in the regular use transmission path, the power transmission line protection function of the current differential relay device stops during the confirmation time up until the reception changeover into the standby transmission path is completed.

That is, in the case of a conventional power transmission line protection system of the kind shown in FIG. 4, when a transmission defect arises in the regular use transmission path, as mentioned earlier, after a disturbance in the transmission path is detected by the disturbance detection units 131a and 131b of the transmission means 13a and 13b within the confirmation time and it is judged that reception changeover of the transmission path is required, transmission path reception changeover by the reception changeover means 12a and 12b is necessary and for the confirmation time in this case, for example, time of the order of ten seconds, for example, is required. Hence, during the confirmation time up until the transmission path reception changeover is completed, the power transmission line protection function of the current differential relay device stops and the operating ratio of the current differential relay device drops.

Furthermore, in cases where an intermittent transmission defect arises, transmission path reception changeover is not carried out and repeat of the stoppage and operation of the power transmission line protection function in the current differential relay device occur sometimes. In this case, the operating ratio of the current differential relay device also drops.

DISCLOSURE OF THE INVENTION

The present invention was proposed in order to resolve the problems of the prior art as described hereinabove and an object of the present invention is to provide a highly reliable current differential relay device of a high operating ratio which is capable of continuing the power transmission line protection function without stopping same while maintaining the sampling synchronization between a plurality of terminals even when one of the duplexed transmission paths has a transmission defect, as well as to provide a signal processing method for the current differential relay device and a power transmission line protection system.

In order to achieve the above object, in the present invention, for the duplexed transmission paths, two independent series of the transmission means, timing difference measurement means, and current differential operation means are provided so that each series is associated with each transmission path. The two independent series means performs two-series of sampling pulse signal timing difference measurements independently for each series associated with each transmission path, performs two-series of current differential operations independently for each series associated with each transmission path, and generates a trip signal from the two-series current differential operation result. As a result, the power transmission line protection function can be continued without be stopped while maintaining the sampling synchronization between a plurality of terminals even when one of the duplexed transmission paths has a transmission defect.

That is, the current differential relay device of the present invention is a current differential relay device that is installed at one end of a power transmission line and connected to another current differential relay device installed at another end of the power transmission line via two transmission paths, comprising, in a basic configuration, a sampling pulse signal generation means, a timing difference measurement means, a correction means, an analog/digital conversion means, a transmission means, a current differential operation means, and a signal generation means. The basic functions of these means are as follows. The sampling pulse signal generation means generates a sampling pulse signal that indicates sampling timing of quantity data of electricity of each terminal. The timing difference measurement means measures a sampling pulse signal timing difference between one end of and the other end of the power transmission line. The correction means corrects the sampling timing on the basis of the timing difference measurement result. The analog/digital conversion means samples quantity data of electricity of each of the terminals at the sampling timing and performs analog/digital conversion. The transmission means communicates with the other end of the power transmission line through the two transmission paths and transmits and receives the quantity data of electricity of each of the terminals to and from the other end in the form of the digital data obtained through the analog/digital conversion. The current differential operation means performs a current differential operation by using the digital data of the quantity data of electricity of the one end of the power transmission line and of the other end of the power transmission line. The signal generation means generates a trip signal from the current differential operation result.

The current differential relay device of the present invention has the following technological characteristics in a current differential relay device which has a basic configuration such as that mentioned hereinabove. First, the current differential relay device comprises, as the transmission means and timing difference measurement means, two series of the transmission means for communicating in parallel with the other end through the two transmission paths and two series of the timing difference measurement means for performing timing difference measurement independently for each of the transmission paths. The current differential relay device comprises, as new means provided in accordance with two series configuration of the timing difference measurement, a changeover means for selecting one of the timing difference measurement results of the two series of the timing difference measurement means and transferring the selected timing difference measurement result to the correction means. The current differential relay device comprises, as the current differential operation means, two series of the current differential operation means connected to each of the two series of the transmission means for performing a current differential operation independently for each of the transmission paths. Furthermore, the signal generation means is configured so that it generates a trip signal from the current differential operation results of the two series of the current differential operation means.

Furthermore, the signal processing method of the present invention provides an understanding of the characteristics of the current differential relay device from the perspective of a method and the power transmission line protection system provides an understanding of the characteristics of the current differential relay device from the perspective of the overall system which employs two of the devices.

The present invention is able to provide a highly reliable current differential relay device of a high operating ratio which is capable of continuing the power transmission line protection function without stopping same while maintaining the sampling synchronization between a plurality of terminals even when one of the duplexed transmission paths has a transmission defect, as well as to provide a signal processing method for the current differential relay device and a power transmission line protection system.

BRIEF DESCRIPTION OF THE DRAWINGS

FIG. 5(a) and FIG. 5(b) are principle views illustrating a well-known sampling synchronization method.

Figure 1:
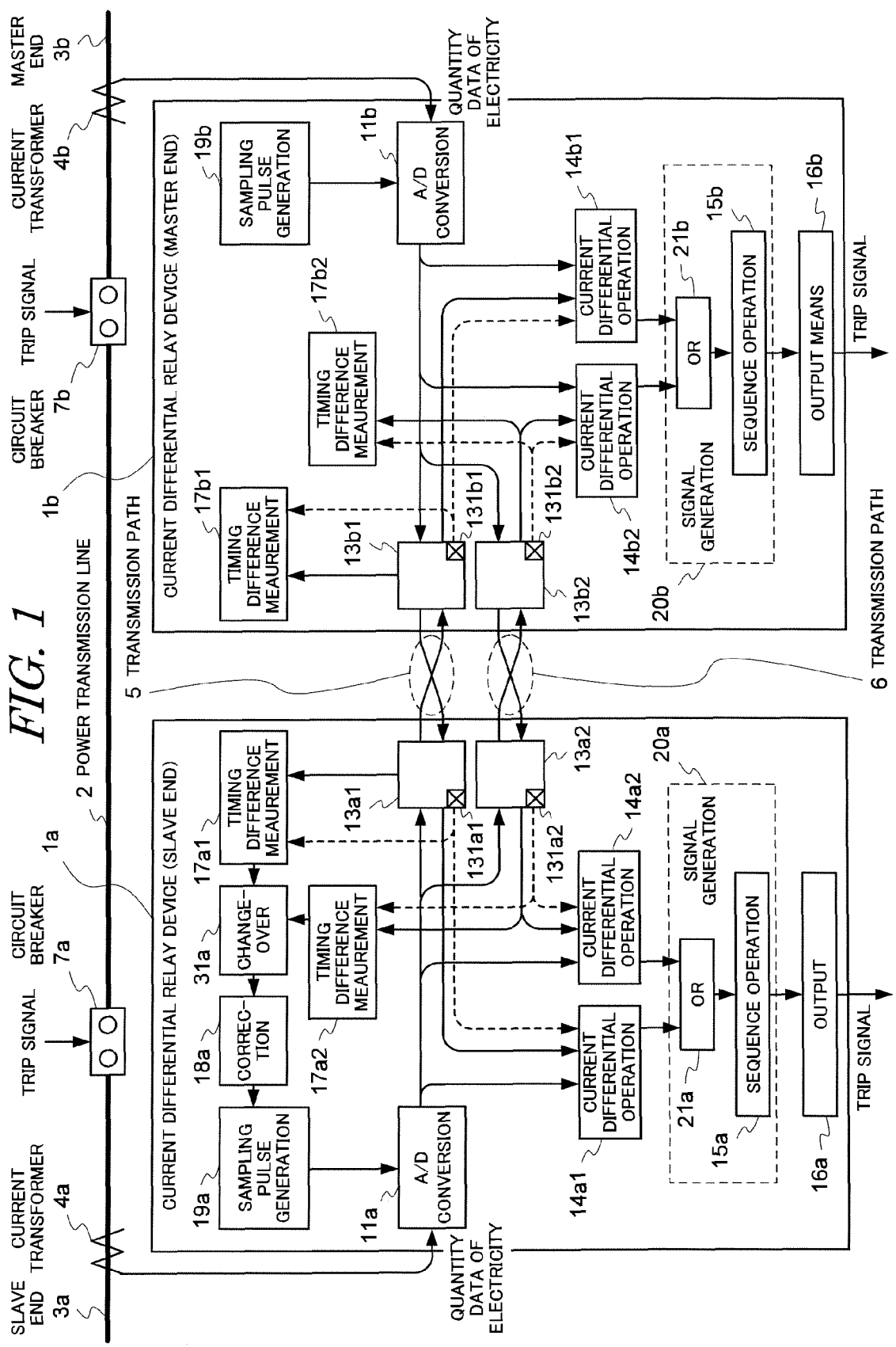
FIG. 1 is a configuration diagram of a power transmission line protection system according to a first embodiment of the present invention.

EXPLANATION OF REFERENCE LETTERS OR NUMERALS 1a, 1b . . . current differential relay device
2 . . . power transmission line
3a . . . slave end
3b . . . master end
4a, 4b . . . current transformer
5, 6 . . . transmission paths
7a, 7b . . . circuit breaker
11a, 11b . . . analog/digital conversion means (A/D conversion means)
12a, 12b . . . reception changeover means
13a, 13b, 13a1, 13a2, 13b1, 13b2 . . . transmission means
131a, 131b, 131a1, 131a2, 131b1, 131b2 . . . disturbance detection unit
14a, 14b, 14a1, 14a2, 14b1, 14b2 . . . current differential operation means
15a, 15b . . . sequence operation means
16a, 16b . . . output means
17a, 17b, 17a1, 17a2, 17b1, 17b2 . . . timing difference measurement means
18a, 18b . . . correction means
19a, 19b . . . sampling pulse generation means
20a, 20b . . . signal generation means
21a, 21b . . . logical disjunction means (OR)
22a, 22b . . . selection means
23a, 23b . . . logical conjunction means (AND)
31a, 31b . . . changeover means

BEST MODE FOR CARRYING OUT THE INVENTION

A plurality of embodiments of the power transmission line protection system according to the present invention will be described specifically hereinbelow with reference to FIGS. 1 to 3. The same numerals are assigned to those parts which are the same as those of the prior art shown in FIG. 4.

Figure 2:
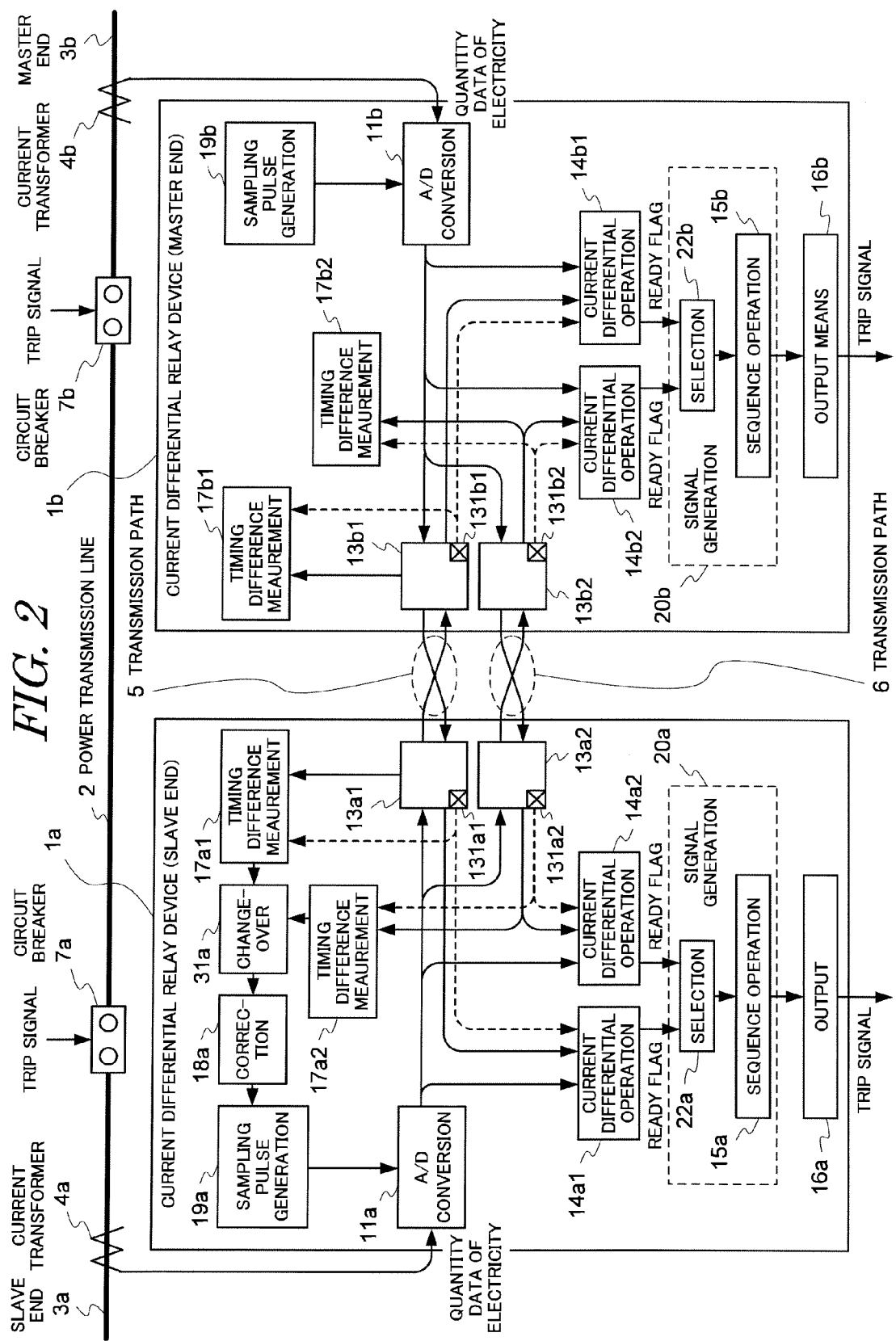
FIG. 2 is a configuration diagram of a power transmission line protection system according to a second embodiment of the present invention.
Figure 3:
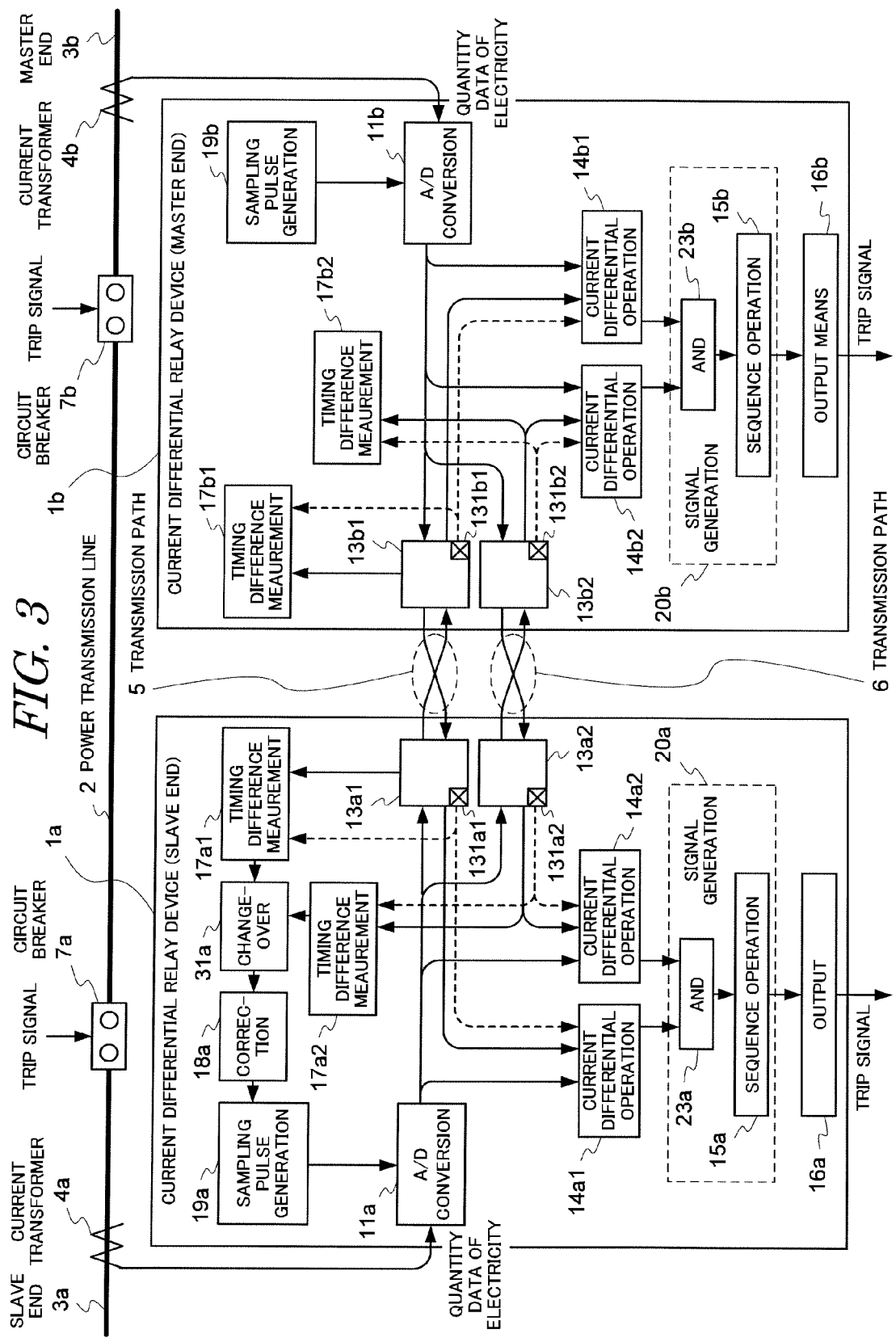
FIG. 3 is a configuration diagram of a power transmission line protection system according to a third embodiment of the present invention.
Figure 4:
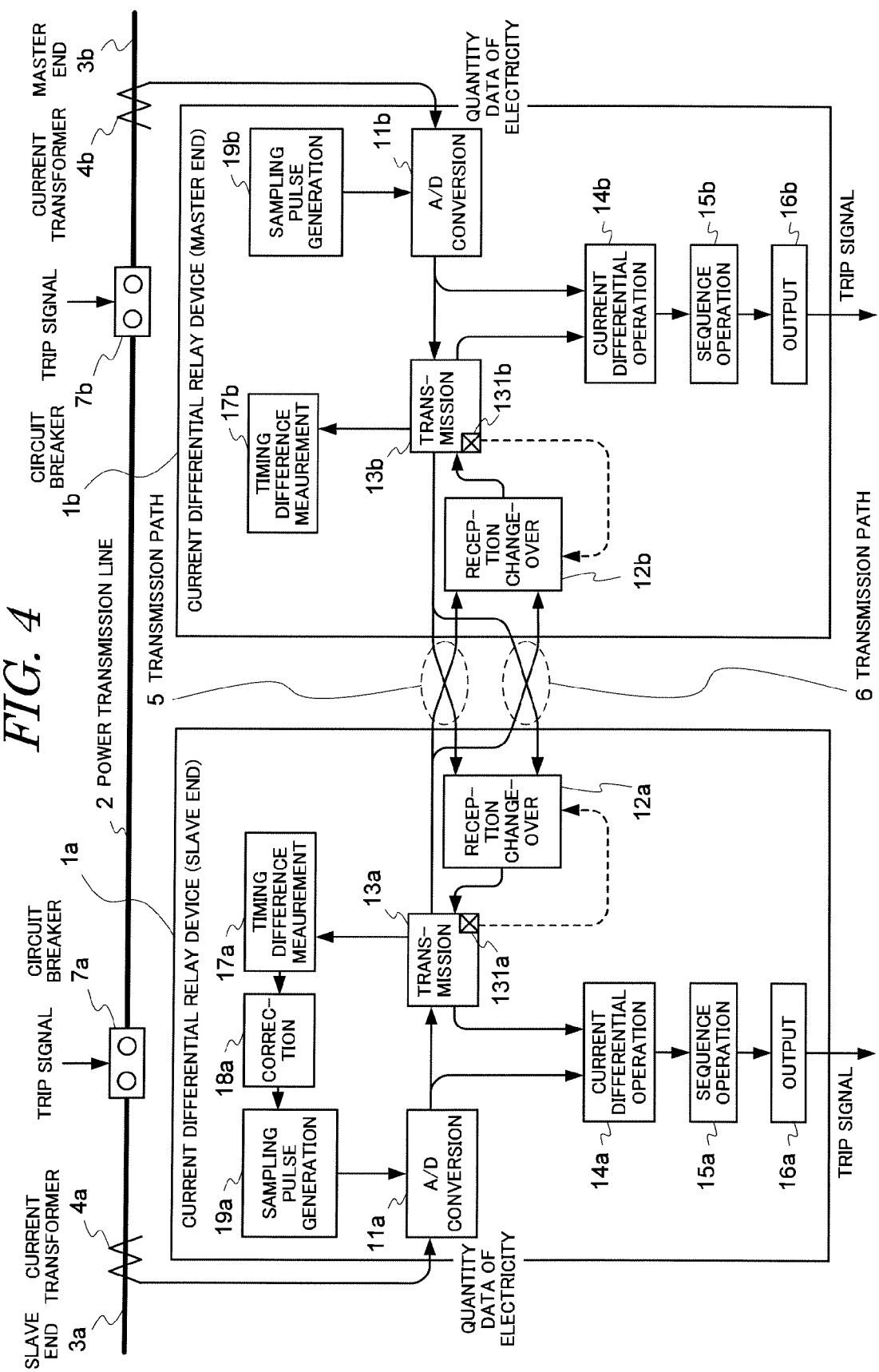
FIG. 4 is a configuration diagram of an example of a power transmission line protection system of a conventional transmission path duplex system.

In addition, in FIGS. 1 to 3, the fact that the alphabetic characters "a" and "b" which are appended to the final letters of the reference numerals representing the respective constituent elements are used in order to distinguish between the slave end 3a and master end 3b of the two-terminal power transmission line 2 and between the current differential relay devices 1a and 1b which are installed at these terminals 3a and 3b and the fact that the configurations of the two current differential relay devices 1a and 1b are mostly the same as each other except for part thereof, are existent, and these facts are the same as those in FIG. 4. In addition, in FIGS. 1 to 3, the appended character strings "a1", "a2", "b1", and "b2" which show the distinction between the terminals and the distinction between the same constituent elements are used at the final letters of the reference numerals since a plurality of the same constituent elements are provided within one current differential relay device 1.

Hence, in the following description, for the sake of simplification, the appended characters "a", "b", or the appended character strings "a1", "a2", "b1", and "b2" appear only in cases where a clear distinction of this kind is required. Furthermore, in cases where a distinction is unnecessary, these appended characters or appended character strings are suitably omitted or "*1" is used for "a1", "b1" and "*2" is used for "a2" and "b2" as representative appended character strings which generally indicate appended character strings.

First Embodiment

[Configuration]

FIG. 1 is a configuration diagram of the power transmission line protection system according to the first embodiment to which the present invention is applied. The basic configuration of the power transmission line protection system shown in FIG. 1 is the same as that of the conventional system shown in FIG. 4. In other words, the two current differential relay devices 1 (1a, 1b) are installed in the respective terminals 3 (slave end 3a and master end 3b) of the two-terminal power transmission line 2 and connected to each other via two transmission paths 5 and 6 so as to carry out a current differential operation by transmitting and receiving quantity data of electricity of their respective terminals to each other.

In the current differential relay device 1 of this embodiment, firstly, two transmission means 13*1 and 13*2 (*=a, b), two current differential operation means 14*1 and 14*2 (*=a, b), and two timing difference measurement means 17*1 and 17*2 (*=a, b) are provided as the transmission means, current differential operation means, and timing difference measurement means, which are used in a conventional transmission path duplex system in such a manner that only single means is used for each type of means.

Here, the two transmission means 14*1 and 14*2 are means which normally communicates with the current differential relay device 1 of the other end in parallel through two transmission paths 5 and 6 and the individual transmission means 14*1 and 14*2 have disturbance detection units 131*1 and 131*2 like the prior art. Here, in cases where a transmission path transmission defect is detected, the disturbance detection units 131*1 and 131*2 transfer the transmission defect detection signal to the timing difference measurement means 17*1 and 17*2 and the current differential operation means 14*1 and 14*2 respectively. Moreover, the two current differential operation means 14*1 and 14*2 are means which carry out two-series of current differential operations independently for each series associated with each of transmission paths 5 and 6 which are connected to the two transmission means 14*1 and 14*2.

In the current differential relay device 1 of this embodiment, as the two-series of current differential operations are thus performed by the two current differential operation means 14*1 and 14*2, in the provided signal generation means 20, a logical disjunction means (OR) 21 is added upstream of sequence operation means 15 which is the same as that of the prior art. The signal generation means 20 obtains the logical disjunction of the two-series current differential operation results by means of the logical disjunction means (OR) 21 and uses the logical disjunction to generate a trip signal by means of the sequence operation means 15.

On the other hand, accompanying the receipt in parallel of data from the two transmission paths 5 and 6 by means of the two transmission means 13*1 and 13*2, the two timing difference measurement means 17*1 and 17*2 are each provided as timing difference measurement means for measuring the sampling pulse signal timing difference for each of the transmission paths 5 and 6. In addition, changeover means 31a for changeovering the two sampling pulse signal timing differences obtained from the timing difference measurement means 17a1 and 17a2 and transferring only either one of the sampling pulse signal timing differences to the correction means 18 is provided in the current differential relay device 1a of the slave end.

The remaining configuration is the same as the configuration of the conventional power transmission line protection system shown in FIG. 4.

[Action]

In the power transmission line protection system according to the first embodiment with the above configuration, the current differential relay device 1 obtains quantity data of electricity by sampling the quantity of electricity of the electric power system by means of the analog/digital conversion means 11 in accordance with the sampling pulse signal which is outputted by the sampling pulse generation means 19.

The quantity data of electricity obtained by the current differential relay device 1 at each end of the power transmission line are transmitted to the current differential relay device 1 of the opposite terminal by means of the transmission means 13s1 and 13s2. Here, the transmission means 13*1 (13a1 and 13b1) and current differential operation means 14*1 (14a1, 14b1) operate independently in accordance with transmission path 5 and the transmission means 13*2 (13a2 and 13b2) and current differential operation means 14*2 (14a2, 14b2) operate independently in accordance with transmission path 6. Therefore, the transmission delay times of transmission paths 5 and 6 need not be the same.

In this case, the logical disjunction of the two-series current differential operation results of the two current differential operation means 14*1 and 14*2 is taken by the logical disjunction means (OR) 21 of the signal generation means 20 and transferred to the sequence operation means 15. Hence, a trip signal is generated by the sequence operation means 15 by means of the current differential operation result basically for the transmission path with the shorter transmission delay time and the trip signal is outputted by the output means 16. Therefore, unless there is a transmission defect in both transmission paths 5 and 6 at the same time, the power transmission line protection function can be continued by either of the current differential operation means 14*1 and 14*2 by using the data from the normal transmission path.

In the current differential relay device 1a of the slave end of the power transmission line, the sampling pulse signal is synchronized with the sampling pulse signal of the master end of the power transmission line by the correction means 18a. In this case, in the current differential relay device 1a at both ends, although the sampling pulse signal timing difference ΔT is calculated by the timing difference measurement means 17*1 and 17*2 for each of the transmission paths 5 and 6, the same sampling pulse signal timing difference ΔT can be obtained by the respective timing difference measurement means 17*1 and 17*2 with respect to the data from the two transmission paths 5 and 6 by means of Expressions (8) and (12) above.

Hence, regardless of which sampling pulse signal timing difference ΔT of which transmission path 5 or 6 is used, since the correct sampling synchronization can be maintained, the operation result for which there is no transmission defect may be selected by the changeover means 31a in the current differential relay device 1a of the slave end and the sampling pulse may be corrected by using the selected operation result by the correction means 18a.

More specifically, one of the transmission paths, for example, such as the transmission path 5 is prioritized, and, as long as the calculation of the sampling pulse signal timing difference ΔT can be continued without there being a transmission defect in the transmission path 5, the usage of ΔT, which is obtained by the timing difference measurement means 17a1, in the sampling pulse correction may be considered. In this case, when a transmission defect arises in the transmission path 5 and the calculation of ΔT by the timing difference measurement means 17a1 is stopped and the calculation of ΔT by the timing difference measurement means 17a2 is continued, ΔT of the timing difference measurement means 17a2 may be used in the sampling pulse correction. The judgment of the existence of a transmission defect by the changeover means 31a is carried out on the basis of the transmission defect detection signal which is transferred from the disturbance detection units 131*1 and 131*2 to the timing difference measurement means 17*1 and 17*2.

[Effect]

In accordance with the first embodiment which has a configuration such as that described above, even when one of the duplexed transmission paths has a transmission defect, the power transmission line protection function can be reliably continued while maintaining the sampling synchronization between a plurality of terminals without completely stopping the current differential operation even temporarily. Hence, the operating ratio and reliability of the current differential relay device can be improved.

Second Embodiment

[Configuration]

FIG. 2 is a configuration diagram of the power transmission line protection system according to the second embodiment to which the present invention is applied. The basic configuration of the power transmission line protection system shown in FIG. 2 is the same as that of the first embodiment shown in FIG. 1 but differs from that of the first embodiment with respect to the following points.

That is, in the current differential relay device 1 of the second embodiment, a ready flag which indicates whether the current state is a locked state or a ready state is outputted by the current differential operation means 14*1 and 14*2 in addition to the current differential operation result. In addition, the signal generation means 20 is provided with selection means 22 for selecting the current differential operation result to be used in accordance with the ready flag instead of the logical disjunction means 21. The remaining configuration is the same as the configuration of the first embodiment.

[Action]

In the power transmission line protection system according to the second embodiment which has a configuration such as that described hereinabove, the action, which differs from that of the first embodiment, is only the processing of the two current differential operation means 14*1 and 14*2 and the signal generation means 20 of the current differential relay device 1.

That is, in the current differential relay device 1 of this embodiment, the two current differential operation means 14*1 and 14*2 are locked when any kind of defect such as a transmission defect, a synchronization defect, or an automatic monitoring defect occur, in the same way as general current differential operation means. The current differential operation means 14*1 and 14*2 of this embodiment output a ready flag which indicates whether the current state is a locked state or a ready state in addition to the current differential operation result.

The ready flag which is thus outputted by the current differential operation means 14*1 and 14*2 is introduced to the selection means 22 of the signal generation means 20 and a current differential operation result representing a ready state is selected and introduced to the downstream sequence operation means 15. Further, of the two individual current differential operation results, the current differential operation result indicating a ready state is used to generate a trip signal by means of the sequence operation means 15 and a trip output is made by the output means 16.

As a specific selection system in this case, settings are made so that in an initial state, for example, the current differential operation result of the current differential operation means 14*1 is prioritized for selection, and, if the ready flag of the other current differential operation means 14*2 is ON when the ready flag of the current differential operation means 14*1 is OFF, that is, in a locked state, the selection of the current differential operation result of the current differential operation means 14*2 may be considered. That is, the non-prioritized current differential operation means 14*2 may be selected in cases where the prioritized current differential operation means is in a locked state and the non-prioritized current differential operation means is in a ready state, and the prioritized current differential operation means may be selected in cases where the prioritized and non-prioritized current differential operation means are both in a ready state or a locked state.

[Effect]

In accordance with the second embodiment which has a configuration such as that described above, effects are obtained, which are substantially equivalent to those of the first embodiment. In other words, even when one of the duplexed transmission paths has a transmission defect, the power transmission line protection function can be reliably continued while maintaining the sampling synchronization between a plurality of terminals without completely stopping the current differential operation even temporarily. Hence, the operating ratio and reliability of the current differential relay device can be improved.

Third Embodiment

[Configuration]

FIG. 3 is a configuration diagram of a power transmission line protection system according to the third embodiment to which the present invention is applied. The basic configuration of the power transmission line protection system shown in FIG. 2 is the same as that of the first embodiment shown in FIG. 1 but differs from that of the first embodiment with respect to the following points.

That is, in the current differential relay device 1 of the third embodiment, a logical conjunction means (AND) 23, which takes the logical conjunction of the two-series current differential operation results, is provided in the signal generation means 20 in place of the logical disjunction means 21. The remaining configuration is the same as the configuration of the first embodiment.

[Action]

In the power transmission line protection system according to the third embodiment which has a configuration such as that described above, the action, which differs from that of the first embodiment, is only the processing of the signal generation means 20.

That is, in the current differential relay device 1 of this embodiment, the logical conjunction of the two-series current differential operation results of the two current differential operation means 14*1 and 14*2 is taken by the logical conjunction means (AND) 23 of the signal generation means 20 and transferred to the sequence operation means 15. Hence, a trip signal is generated by the sequence operation means 15 by using the logical conjunction of the two-series independent current differential operation results and the trip signal is outputted by the output means 16.

In cases where the logical conjunction of the two-series current differential operation results is taken in this way, since the trip signal is generated for the first time when the two current differential operation means **14*1 and 14*2 both attain the operating judgment, it is a precondition that the two transmission paths 5 and 6 to be applied should be of an adequately high quality when the embodiment is applied. Since two transmission paths 5 and 6 of such an adequately high quality are used in this embodiment, the probability of an erroneous trip output which is caused by an erroneous judgment due to a transmission defect can be eliminated as far as possible by taking the logical conjunction of the two-series current differential operation results based on data from the two transmission paths 5 and 6**.

Although systems for reliably finding a transmission defect by adding a CRC code exist as systems for detecting a transmission defect in transmission data, the reliability with which a transmission defect is detected by means of a CRC check is not 100%. Therefore, in general, an erroneous trip output is desirably prevented by means of a technique that combines the use of relay elements with different algorithms such as overcurrent relay elements.

[Effect]

In accordance with the third embodiment, which has a configuration such as that described above, in addition to effects which are substantially equivalent to the effects of the first embodiment, the following effects are obtained. That is, even in cases where one current differential operation means malfunctions as a result of a transmission defect in one of the duplexed transmission paths, as a result of the correct no-operation of the other current differential operation means, an erroneous trip output can be reliably prevented. Therefore, the reliability of the power transmission line protection function can be improved.

Other Embodiments

The present invention is not limited to the above embodiments. A variety of different modified examples can also be implemented within the scope of the present invention. That is, the system configuration and device configuration shown in the drawings merely represents an example and the specific configuration can be suitably selected.

For example, instead of transferring the transmission defect detection signals from the disturbance detection units **131*1 and 131*2 of the transmission means 13*1 and 13*2 to the timing difference measurement means 17*1 and 17*2 in the above-described embodiments, the transmission defect detection signals can also be transferred to the changeover means 31** so that the sampling pulse signal timing difference can be changeovered.

Moreover, although a two-terminal power transmission line was described in the above-described embodiments, the present invention can also be similarly applied to current differential relay devices which are installed on a power transmission line which has three or more terminals, and in which similarly superior effects can be obtained.

The invention claimed is:

1. A current differential relay device that is installed at one end of a power transmission line and connected to another current differential relay device installed at another end of the power transmission line via two transmission paths, comprising:
a sampling pulse signal generation part for generating a sampling pulse signal that indicates sampling timing of quantity data of electricity of each terminal;
two timing difference measurement parts independent to each other and measuring a sampling pulse signal timing difference between the one end and the other end of the power transmission line independently for each of the transmission paths;
a changeover part which detects a transmission defect of two timing difference measurement results of the two timing difference measurement parts and selects one timing difference measurement result having no transmission defect;
a correction part for correcting the sampling timing on the basis of the selected timing difference measurement result transferred from the changeover part;
an analog/digital conversion part for sampling quantity data of electricity of each of the terminals at the sampling timing and performing analog/digital conversion on the sampled quantity data of electricity;
two transmission parts provided in parallel and communicating with the other end of the power transmission line through the two transmission paths and transmitting and receiving the quantity data of electricity of each of the terminals to and from the other end in the form of the digital data obtained through the analog/digital conversion;
two current differential operation parts connected to each of the two transmission parts and performing a current differential operation independently for each of the transmission paths by using the digital data of the quantity data of electricity of the one end of the power transmission line and of the other end of the power transmission line; and
a signal generation part for generating a trip signal from the current differential operation result of the two current differential operation parts,
wherein the signal generation part is configured so that it generates a trip signal by using the logical conjunction of the two current differential operation results.

2. A signal processing method for a current differential relay device that is installed at one end of a power transmission line and connected to another current differential relay device installed at another end of the power transmission line via two transmission paths, the method comprising the steps of:
generating a sampling pulse signal that indicates sampling timing of electronic amount data of each terminal;
measuring two sampling pulse signal timing difference measurements independent to each other between the one end and the other end of the power transmission line for each of the transmission paths;
detecting a transmission defect of two timing difference measurement results and selecting one of the two timing difference measurement results and correcting the sampling timing on the basis of the selected timing difference measurement result;
sampling the quantity data of electricity of each terminal at the sampling timing and performing analog/digital conversion on the sampled quantity data of electricity;
communicating in parallel with the other end of the power transmission line through the two transmission paths, and transmitting and receiving the quantity data of electricity of each of the terminals to and from the other end in the form of the digital data obtained through the analog/digital conversion;
performing two current differential operations independent to each other for each of the transmission paths by using the digital data of the quantity data of electricity of the one end of the power transmission line and of the other end of the power transmission line; and generating a trip signal from the two current differential operation results by using the logical conjunction of the two current differential operation results.

3. A power transmission line protection system in which two current differential relay devices installed at each of two terminals of a power transmission line are connected to each other via two transmission paths, each of the two current differential relay devices comprising:

a sampling pulse signal generation part for generating a sampling pulse signal which indicates sampling timing of quantity data of electricity of each terminal;

two timing difference measurement parts independent to each other and each measuring the sampling pulse signal timing difference between one end of and the other end of the power transmission line;

a changeover part which detects a transmission defect of two timing difference measurement results of the two timing difference measurement parts and selects one of the two timing difference: measurement results of the two timing difference measurement parts;

a correction part for correcting the sampling timing on the basis of the selected timing difference measurement result transferred from the changeover part;

an analog/digital conversion part for sampling quantity data of electricity of each of the terminals at the sampling timing and performing analog/digital conversion on the sampled quantity data of electricity;

two transmission parts provided in parallel and communicating with the other end of the power transmission line through the two transmission paths, and transmitting and receiving the quantity data of electricity of each of the terminals to and from the other end in the form of the digital data obtained through the analog/digital conversion;

two current differential operation parts independent to each other and connected to each of the two transmission parts and performing a current differential operation for each of the transmission paths by using the digital data of the quantity data of electricity of one end of the power transmission line and of the other end of the power transmission line; and a signal generation part for generating a trip signal from the current differential operation result of the two current differential operations parts, wherein the signal generation part is configured so that it generates a trip signal by using the logical conjunction of the two current differential operation results.

* * * * *